United States Patent [19]

Hipple et al.

[11] Patent Number: 4,744,630
[45] Date of Patent: May 17, 1988

[54] PANEL INDICATOR

[75] Inventors: James H. Hipple; Don W. Smith, both of Lancaster, Ohio

[73] Assignee: The Babcock & Wilcox Company, New Orleans, La.

[21] Appl. No.: 434,682

[22] Filed: Oct. 15, 1982

[51] Int. Cl.⁴ .......................... G02B 6/36; G02B 7/26
[52] U.S. Cl. ............................. 350/96.20; 350/96.18
[58] Field of Search .................... 350/96.18, 96.20; 250/227

[56] References Cited

U.S. PATENT DOCUMENTS 3,539,796  11/1970  Zychal .................. 350/96.18
4,186,995  2/1980  Schumacher ............ 350/96.18

Primary Examiner—William L. Sikes
Assistant Examiner—Robert E. Wise
Attorney, Agent, or Firm—Vytas R. Matas; Robert J. Edwards

[57] ABSTRACT

A panel indicator (10) which includes a light transmitting indicator rod (16) in engagement with the end (40) of a fiber optic cable (14). A portion of the rod protrudes beyond a retaining housing (12) and has a conical depression (28) formed axially thereof to provide maximum radial dispersion of light from the rod for lateral viewing thereof.

10 Claims, 1 Drawing Sheet

PANEL INDICATOR

TECHNICAL FIELD

The present invention relates to panel indicators generally, and in particular to a highly visible indicator for use in a fiber optic remote display device.

BACKGROUND ART

Display devices employing fiber optics have become well known in many industries. In one form of such a device an optic signal, for example, from a boiler water level indicator or the like, is transmitted along a length of a fiber optic cable to a remote readout area, such as a control room, where the other end of the fiber optic cable terminates in a display panel.

In prior art display panels the readout display is in the form of a matte screen which is mounted at the end of the fiber optic cable and is effective to increase the output angle of the fiber optic cable from a normal 26° output angle to an angle of 160°.

In many instances, however, it is necessary to view the display laterally, at an angle to the display which is greater than that afforded by a matte screen; therefore, it is desirable to have a fiber optic display which protrudes from the panel. While protruding, transluscent buttons which are illuminated from within are known, for example, on illuminated button switches and the like, these are visible essentially from the end only, and do not disperse sufficient light laterally to serve as an efficient readout of this type. Also, in a fiber optic display wherein the fiber optic cable is quite long, there is a significant loss of light signal which makes it important to provide maximum dispersion of the light for lateral viewing.

SUMMARY OF THE INVENTION

The present invention solves the aforementioned problems associated with the prior art as well as other problems by providing a panel indicator consisting of a cylindrical transparent member or rod which is connected to the end of a fiber optic cable, and which is adapted to be received in a control panel with a portion of the cylindrical member protruding outwardly from the panel. The rod includes a polished end surface and an internal configuration which causes the light entering the rod from the fiber optic cable to be dispersed to the side surface of the rod for lateral viewing. In accordance with a preferred embodiment of the invention, lateral dispersion is provided by forming a conical depression in the polished outer end of the rod and by frosting the surface of the depression and the side surface of the rod. The rod is received in a connector housing which retains a frusto-conical end portion of the rod in contact with the end of the fiber optic cable, and which is adapted for attachment to a panel.

DESCRIPTION OF THE PREFERRED EMBODIMENT

Figure 1:
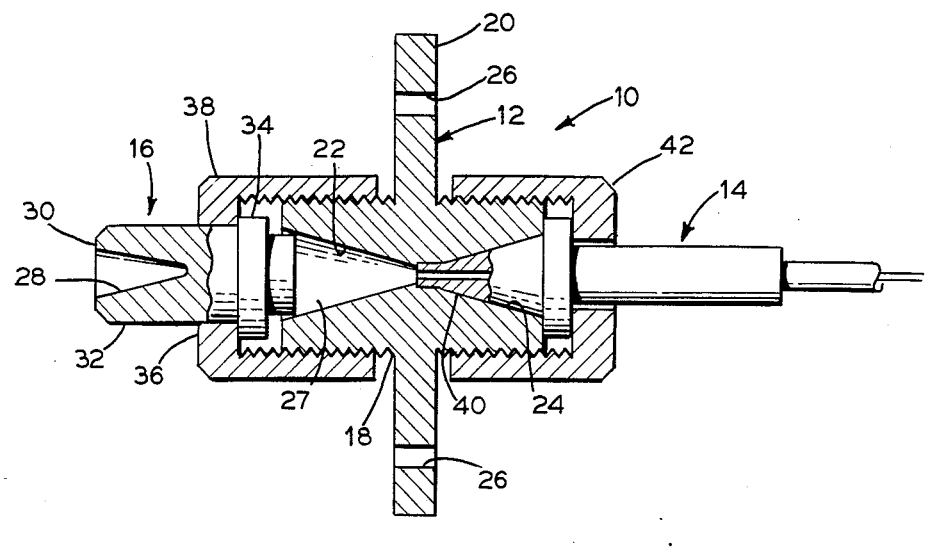
FIG. 1 is a cross-sectional view of the invention.
Figure 2:
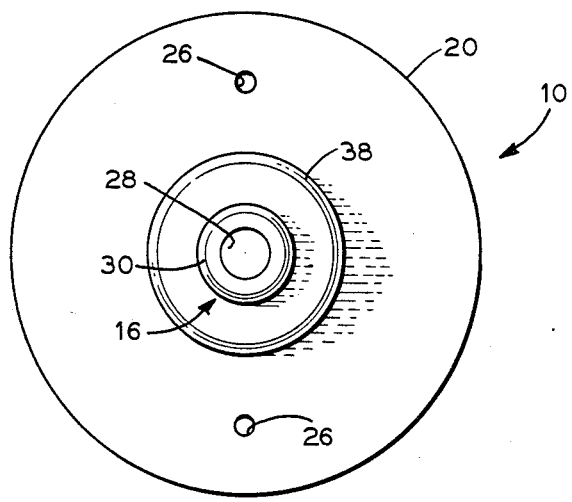
FIG. 2 is an elevation view taken from the left side of FIG. 1.

Referring now to the drawings wherein the illustrations are for purposes of describing a preferred embodiment of the present invention and are not intended to limit the invention thereto, FIG. 1 illustrates a panel indicator assembly 10 comprising a housing 12 adapted for attachment to a control panel, and to a fiber optic cable 14; and a transparent indicator rod 16 retained within the housing.

The housing 12 serves to mount the indicator assembly to a panel, and also to connect the indicator rod 16 to the fiber optic cable, and comprises an externally threaded hub portion 18 and a flange portion 20 generally centrally disposed relative to the hub portion. The housing 12 has first and second frusto-conical depressions 22 and 24 formed axially inwardly from the ends of the hub portion 18 to receive end portions of the indicator rod 16 and the fiber optic cable 14, respectively, as will be described in more detail. The flange portion 20 has a plurality of holes 26 formed therethrough to adapt the housing for attachment to a control panel, although it will be appreciated that other means for attaching the assembly 10 to a panel can also be employed.

The indicator rod 16 comprises a generally cylindrical transparent member having a frusto-conical end portion 27 which is received in the depression 22. In accordance with the invention, the end of the rod which protrudes from the housing has a conical depression 28 formed axially thereof. To provide maximum transmission of light axially through the rod, the end surface of the end portion 27 is polished, as is the annular area 30 surrounding the opening of the conical depression 28. To provide maximum radial dispersion of light for lateral viewing of the display, the surface of the depression 28, and the outer diameter 32 of the protruding portion of the rod are frosted.

The rod 16 includes an increased diameter portion 34 which is engaged by an inwardly directed lip 36 of a nut 38 which engages the hub portion 18 to retain the rod.

The fiber optic cable 14 is a well-known structure which will not be described in detail herein. The cable has a frusto-conical end portion 40 which is received within the depression 24 and is retained therein by a nut 42 which is similar to the nut 38. The interior of the cable includes a plurality of individual fiber, the ends of which are polished. When the indicator 10 is assembled as shown in FIG. 1, the polished interior ends of the rod 16 and the cable 14 are maintained in contact with each other by the clamping action of the nuts 38 and 42.

In operation, a light signal from a condition-indicating system or the like is transmitted along the fiber optic cable 14 to the panel indicator assembly 10 where it is transmitted to the indicator rod 16. The frosted surface of the conical depression 28 is illuminated by the transmitted light to provide good lateral vision of the indicator, and the light transmitted through the polished end surface 30 forms a bright ring of light which enhances the display as viewed from the end of the panel indicator.

It should be noted that the materials from which the inventive panel indicator is formed are not critical. For example, the indicator rod 16 can be formed of glass or of a transparent plastic material, and the housing 12 including nuts 38 and 42 can be metal or plastic.

Certain modifications and improvements will occur to those skilled in the art upon reading the foregoing. It should be understood that all such modifications and improvements have been deleted herein for the sake of conciseness and readability, but are properly within the scope of the following claims.

We claim:

1. A panel indicator comprising a housing, a first light transmitting member received within said housing and having an exposed end portion protruding therefrom for emitting light received at the opposite end of said first member along said exposed end portion, said first light transmitting member having a concial depression formed in said protruding end portion for dispersing light received by said first member from the end portion for lateral viewing of the exposed illuminated end portion.

2. The apparatus as defined in claim 1, in which said first light transmitting member comprises a cylindrical member, said conical depression being formed axially thereof.

3. The apparatus as defined in claim 2, in which said housing has a frusto-conical depression formed therein, and said first light transmitting member includes a frusto-conical portion received within said first frusto-conical depression.

4. The apparatus as defined in claim 3, in which said first light transmitting member is transparent, and the outer side of said protruding end portion and the surface of said conical depression are frosted.

5. The apparatus as defined in claim 4, in which the end of the frusto-conical portion of said first light-transmitting member and the end surface of the protruding end portion thereof are polished.

6. The apparatus as defined in claim 5, including means engageable with said housing and with said light transmitting member adapted to maintain the polished end of said frusto-conical portion in engagement with a second light transmitting member.

7. The apparatus as defined in claims 3, 4 or 5, including in combination therewith, a fiber optic cable having a frusto-conical end portion in engagement with the frusto-conical portion of said first light transmitting member.

8. The apparatus as defined in claim 7, including a second frusto-conical depression formed in said housing coaxially with said first frusto-conical depression, the frusto-conical end portion of said fiber optic cable being received within said second frusto-conical depression.

9. The apparatus as defined in claims 1 or 2, including, in combination therewith, a second light transmitting member having an end portion in engagement.

10. The apparatus as defined in claim 9, in which said second light transmitting member comprises a fiber optic cable.

* * * * *